United States Patent [19]
Grochowski et al.

[11] Patent Number: 5,586,276
[45] Date of Patent: Dec. 17, 1996

[54] END BIT MARKERS FOR INDICATING THE END OF A VARIABLE LENGTH INSTRUCTION TO FACILITATE PARALLEL PROCESSING OF SEQUENTIAL INSTRUCTIONS

[75] Inventors: Edward Grochowski, San Jose; Kenneth Shoemaker, Saratoga, both of Calif.

[73] Assignee: Intel Corporation, Santa Clara, Calif.

[21] Appl. No.: 301,313

[22] Filed: Sep. 6, 1994

Related U.S. Application Data

[63] Continuation of Ser. No. 831,942, Feb. 6, 1992, abandoned.
[51] Int. Cl.$^6$ .................................................. G06F 9/00
[52] U.S. Cl. .................. 395/380; 395/800; 364/DIG. 1; 364/274.1; 364/275.8; 364/262.81
[58] Field of Search ..................................... 395/800, 250, 395/275, 425, 500, 725, 375, 400

[56] References Cited

U.S. PATENT DOCUMENTS

| | | | |
|---|---|---|---|
| 4,530,050 | 7/1985 | Fukunaga et al. | 395/375 |
| 4,766,566 | 8/1988 | Chuang | 395/375 |
| 5,113,515 | 5/1992 | Fite et al. | 395/425 |
| 5,202,972 | 4/1993 | Gusefski et al. | 395/425 |

*Primary Examiner*—Mehmet Geckil
*Attorney, Agent, or Firm*—Blakely, Sokoloff Taylor & Zafman

[57] ABSTRACT

Apparatus for determining the length of an instruction being processed by a computer system when instructions vary in length and appear sequentially in an instruction stream without differentiation between instructions including apparatus for providing an end bit for each predesignated length of an instruction to indicate that the instruction ends at that point in its length, apparatus for setting the end bit at the particular predesignated length of the instruction which is the actual end of the instruction, a first channel for processing a first instruction in sequence, a second channel for processing an instruction next following the first instruction, and apparatus for looking at the end bits of an instruction being processed by the first channel to determine the end point of that instruction and the beginning of the next instruction from the stream of instructions.

20 Claims, 5 Drawing Sheets

| | F | ... | C | B | A | 9 | 8 | 7 | 6 | 5 | 4 | 3 | 2 | 1 | 0 | |
|---|---|---|---|---|---|---|---|---|---|---|---|---|---|---|---|---|
| CACHE OPCODE | 47 | | 00 | 00 | 00 | 01 | 00 | E8 | A6 | 55 | 6F | CF | BA | 08 | 38 | (HEX) |

| | F | ... | C | B | A | 9 | 8 | 7 | 6 | 5 | 4 | 3 | 2 | 1 | 0 | |
|---|---|---|---|---|---|---|---|---|---|---|---|---|---|---|---|---|
| CACHE END BIT | 0 | | 1 | 0 | 0 | 0 | 0 | 0 | 0 | 1 | 0 | 0 | 0 | 0 | 1 | 0 | (BINARY) |

PREFETCH POINTER: 02 (hex)

U PIPE OPCODE: BA CF 6F 55 A6 (hex) ——— U PIPE INSTRUCTION BEGINS AT 02h

U PIPE INSTRUCTION: mov edx, 0a6556fcfh

V PIPE OPCODE: E8 00 01 00 00 (hex) ——— V PIPE INSTRUCTION BEGINS AT 07h

V PIPE INSTRUCTION: call 100h

END BITS: 00001

NEXT PREFETCH POINTER: 0C (hex) ——— NEXT PAIR BEGINS AT 07h

FIG. 4

END BIT MARKERS FOR INDICATING THE END OF A VARIABLE LENGTH INSTRUCTION TO FACILITATE PARALLEL PROCESSING OF SEQUENTIAL INSTRUCTIONS

This is a continuation/divisional of application Ser. No. 07/831,942 filed Feb. 06, 1992 now abandoned.

BACKGROUND OF THE INVENTION

1. Field of the Invention

This invention relates to computer systems and, more particularly, to methods and apparatus for providing end bit markers for allowing a super scaler computer to process simultaneously a pair of instructions which may vary in length from a stream of instructions.

2. History of the Prior Art

There is a continual attempt to make computers run faster. One way in which this may be accomplished is to make a computer process instructions faster. Typically, a computer processor handles the instructions of any process in sequential order, one after another. Thus, instruction one must be processed or at least begun (put in the pipeline) before instruction two can start. However, if two or more instructions can be run simultaneously, the computer will be able to process instructions faster. This may be accomplished by providing a central processor having more than one processing path and running instructions through the processing paths simultaneously. A computer having a processor with two or more processing paths which are capable of simultaneously processing the same type of general machine instructions which are normally run serially is called a super scaler computer.

One problem encountered in designing any new computer is that such a computer to be commercially successful must have a base of application programs which it can run when it is introduced in order to be of interest to users. The most economic way to provide these programs is to design the new computer to operate the application programs designed for an earlier computer or family of computers. This type of design is exemplified by computers using the microprocessors manufactured by Intel Corporation in the line including the 8086, 8088, 80186, 80286, 386™, and i486™ microprocessors (hereinafter referred to as the Intel microprocessors).

A problem with designing any new processor to function with software used by older computers is that the new machine must be able to understand and process the instructions of that software. The instructions used in the Intel microprocessors vary in length from one byte to fifteen bytes. These instructions are arranged in existing programs for the Intel microprocessors to be manipulated in typical sequential order.

One way in which the speed of computers is increased is by pipelining instructions. Instead of running through each instruction until it is completed and then commencing the next instruction, the stages of an instruction are overlapped so that no part of the processor lies idle while another stage is being accomplished. The computers using the Intel microprocessors pipeline instructions so that each stage of each instruction may be handled in one clock period. In general, this requires that an instruction be fetched from wherever it is stored, that it be decoded, then executed, and finally that the results of the execution be written back to storage for later use. The circuitry is designed so that the different stages each require one clock period. Different portions of the processor accomplish each of the steps in the pipeline on sequential instructions during each clock period. Thus, during a first clock period the prefetch portion of the computer fetches an instruction from storage and aligns it so that is ready for decoding. During a second clock period the prefetch portion of the computer fetches the next instruction from storage and aligns it so that is ready for decoding in the third clock period. A decoder portion of the processor accomplishes the decoding of the first instruction fetched during the second clock period. The decoder portion accomplishes the decoding of the second instruction fetched during the third clock period. By pipelining instructions the overall speed of operation is significantly increased.

The instructions are furnished on the bus or from a cache memory as a stream of bytes in which no instruction is differentiated from any other. Each instruction (in general) appears in sequential order in any process. To maintain the computer speed, the instructions must be prefetched from these sources in one clock period. This means that the end of the first instruction the length of which is unknown must be determined in one clock period so that the next instruction may be selected during the next clock period. In order to determine the length of an instruction being processed at any time, previous Intel microprocessors first decoded the instruction to determine its content. When this has been accomplished, the length of the instruction being processed and the starting point for the next instruction in sequence are known and can be fed back to the prefetch unit. This has forced the decoding of instructions in all previous computers based on the Intel microprocessors to be conducted serially.

Since a super scaler machine must process at least two instructions simultaneously, it must decode two instructions simultaneously. However, to select the beginning of a second instruction from the stream of information available, it must know where a first instruction ends. Yet only by decoding the first instruction can it know the length of the first instruction and, thus, where the second instruction begins. The entire purpose of the super scaler to process two instructions at the same time is thwarted if the processing of the second instruction must await the decoding of the first instruction before it can begin.

SUMMARY OF THE INVENTION

It is, therefore, an object of the present invention to provide an arrangement for allowing a super scaler computer to process simultaneously two instructions of unknown lengths which are presented in sequence with no differentiation between instructions.

It is another more specific object of the present invention to provide an arrangement for determining the length of instructions being processed by a super scaler computer without the need to decode the instructions to make the determination.

These and other objects of the present invention are realized in apparatus for determining the length of an instruction being processed by a computer system when instructions vary in length and appear sequentially in an instruction stream without differentiation comprising means for providing an end bit for each predesignated length of an instruction to indicate that the instruction ends at that point in its length, means for setting the end bit at the particular predesignated length of the instruction which is the actual end of the instruction, a first channel for processing a first instruction in a sequence of instructions, a second channel for processing an instruction next following the first instruction in the sequence of instructions, and means for looking at the end bits of an instruction being processed by the first channel to determine the end point of that instruction and the beginning of the next instruction from the stream of instructions.

These and other objects and features of the invention will be better understood by reference to the detailed description which follows taken together with the drawings in which like elements are referred to by like designations throughout the several views.

BRIEF DESCRIPTION OF THE DRAWINGS

FIG. 4 is an illustration of bit positions within various elements of the arrangement of FIG. 1 during the operation thereof.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human Operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

Figure 1:
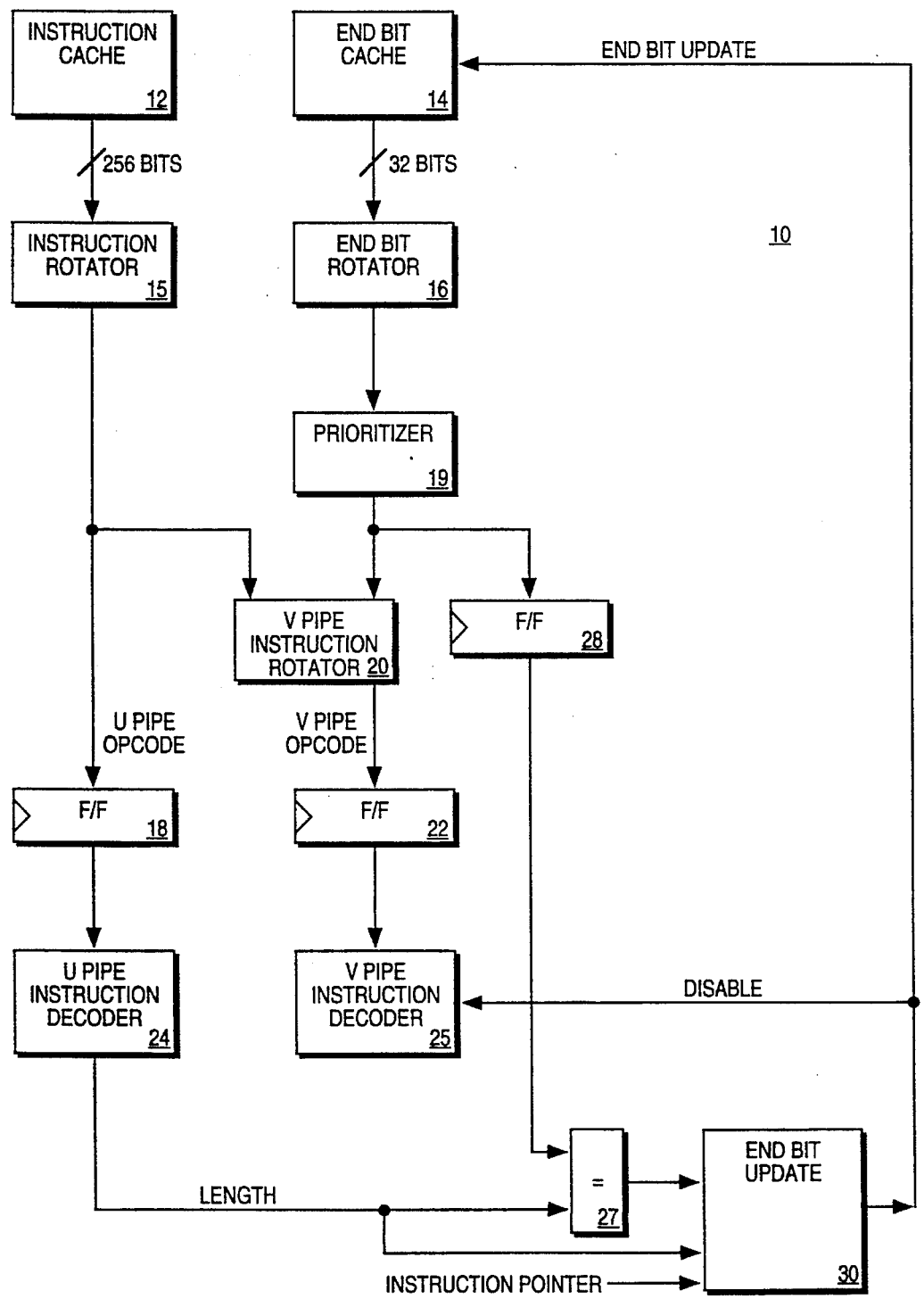
FIG. 1 is a block diagram of an arrangement in accordance with the invention for processing two instructions simultaneously.

Referring now to FIG. 1, there is shown a block diagram of an arrangement 10 for carrying out the present invention. The arrangement 10 includes a cache memory 12 for storing recently utilized instructions. Typically such a cache memory is utilized by a central processor to provide rapid access to information without the necessity of referring to main memory. In the circuitry with which the present invention cooperates, the cache memory 12 is the usual source of the instructions utilized by the central processor although some instructions arrive on the system bus from main memory and prefetch buffers. Since the source of the information does not affect the explanation of the invention, only the cache memory 12 is shown in FIG. 1 as such a source. In a preferred embodiment of the invention, the cache memory includes eight kilobytes of storage arranged in lines each of which are 256 bits wide. A total of 256 lines provide sufficient storage for this amount of instruction data. The details of the particular cache memory 12 utilized are not pertinent to this invention and are therefore not explained at length in this specification.

In addition to the cache memory 12 used for storing instructions, the arrangement utilizes an end bit cache memory 14. The end bit cache memory 14 is utilized to store bits which designate the end of each byte of instruction data stored in the cache memory 12. In the preferred embodiment of the invention, a single bit designating the end of a byte of an instruction stored in the cache memory 12 is stored in the cache memory 14. An example of the pattern of information stored in the instruction cache memory 12 and the end bit cache memory 14 are shown in FIG. 4 and discussed in detail hereinafter. The cache memory 14 of the preferred embodiment includes the same number of lines (256) as does the cache memory 12, but each line of the cache is only 32 bits wide since only 32 bytes can be stored in any 256 bit line of the cache memory 12. It would be possible in a particular computer to utilize end bits which indicate some length other than a byte of memory (such as a half word) were another length to be a more convenient measure for the particular processor.

Each line of the instruction cache memory 12 and the associated line of the end bit cache memory 14 share the same tag bits so that associated lines of both memories hit or miss together when accessed. The end bits stored in the cache memory 14 are used to designate the end of each sequential instruction stored in the cache memory 12 so that a determination of the length of each instruction being processed can be made before the instruction is decoded. In this manner, the rate of operation of a super scaler computer may be maintained even though instructions of varying lengths appear sequentially in programs run by the processor without any indication of their length until decoded.

The particular line of the cache memory 12 being accessed for an instruction to be utilized by the central processor is furnished to a rotator 15, and the associated line of bits in the cache memory 14 is furnished to a rotator 16. That is, if line three of cache memory 12 is accessed for a particular instruction, then line three of cache memory 14 is accessed for the end bits associated with the instructions stored in the accesses line of the cache memory 12. The means for accessing cache memories are well known, are not pertinent to the invention, and are therefore not discussed in the present specification. Thus, for each line of code in the cache memory 12 there resides a line of end bits in the cache memory 14; and for each line of code transferred from the cache memory 12 by the rotator 15, a line of end bits stored in the cache memory 14 is transferred by the rotator 16.

The value of a prefetch instruction pointer is furnished to each of the rotators 15 and 16 to select the beginning of the first of two instructions being processed and to properly align the beginning of that first instruction for processing.

Similarly, the instruction pointer value selects and aligns the beginning end bit for the instruction being processed. This instruction pointer value is obtained from the calculation of the combined length of the last two instructions processed. The details of a circuit for generating prefetch instruction pointer values are disclosed in U.S. patent application Ser. No. 07/831,825, entitled Rotators in Machine Instruction Length Calculation, E. Grochowski et al, filed on even date herewith and assigned to the assignee of the present invention.

A rotator which may be utilized for accomplishing the purposes of rotator 15 is described in detail in U.S. patent application Ser. No. 07/831,968, entitled Two Stage Window Multiplexors For Deriving Variable Length Instructions From a Stream Of Instructions, E. Grochowski, filed on even date herewith and assigned to the assignee of the present invention. That patent application also describes in detail prior art rotators which might be used for rotators 16 and 20 of the present invention. The basic purpose of the rotators 15 and 20 is to derive a sequence of bytes long enough to include the instructions being processed and to align those instructions so that the beginning of a particular instruction is first to be processed in the processing channel which follows. The rotator 16 accomplishes the same rotation of the bits designating the end of each byte in the associated line.

The line of instructions selected with the instruction being processed properly aligned is transferred from the rotator 15 to a U pipe opcode flip-flop 18 for processing. The U pipe is one of the two processing channels utilized in the super scaler computer which utilizes the present invention. The second processing channel is designated the V pipe. The next succeeding instruction after that being processed by the U pipe is furnished to the V pipe channel in the following manner. The end bits in the end bit cache 14 related to the line of instructions transferred to the U pipe from the rotator 15 are transferred to a prioritizer 19 and aligned by the rotator 16. Thus, if a line of instructions aligned at the beginning of a first four byte instruction has been transferred to the U pipe flip-flop 18, the end bits are transferred to the prioritizer 19 aligned at the beginning of the first of the four bits related to the four byte instruction.

Figure 2:
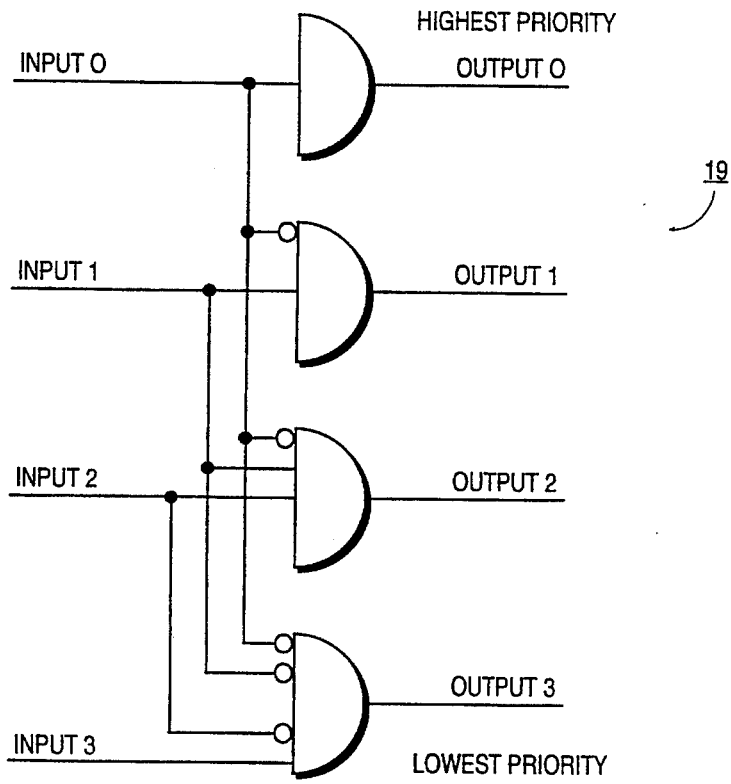
FIG. 2 is a more detailed description of a first portion of the arrangement of FIG. 1.

The prioritizer 19 then selects the first end bit which is set to one. To accomplish this operation, the prioritizer may include a series of AND gates, one for each of the end bits transferred by the rotator 16. If each sequential AND gate is provided with an input from a sequential one of the bit positions of the aligned line of end bits, then gates receiving a one as an end bit may be made to transfer a one value. The first of these is selected by providing as other inputs to the AND gates the inverted input from each succeeding end bit in the sequence. Thus, only the first AND gate associated with a one end bit will transfer a one value. The particular AND gate of the prioritizer 19 producing a one value indicates the length of the instruction in bytes and the end of the instruction being processed by the U pipe. Thus, this first one value indicates where the first instruction ends and the second begins and may be used to divide the instructions for processing. A prioritizer circuit such as that described is illustrated in FIG. 2. As will be seen, in the circuit 19 of FIG. 2, output 0 is the highest priority while output 3 is the lowest priority.

The results produced by the prioritizer 19 are then used to cause a third rotator 20 to rotate the instruction stream furnished by the rotator 15 so that the first byte of the next succeeding instruction is aligned for processing by the V pipe channel. This aligned instruction stream is transferred to a V pipe flip-flop 22 so that the instruction which is aligned may be processed at the same time as the preceding instruction being processed by the U pipe channel. From the U pipe flip-flop 18, the U pipe instruction is transferred to a U pipe decoder 24 where it is decoded for use. From the V pipe flip-flop 22, the V pipe instruction is transferred to a V pipe decoder 25 where it is decoded for use. From this point on, the instructions proceed through separate processing channels in a manner which is not the subject of this specification.

However, the length of the instruction in the U pipe decoder 24 is determined as the instruction is decoded and transferred to a comparator 27. The apparatus for accomplishing this determination is described in detail in U.S. patent application Ser. No. 07/831,825, entitled Rotators in Length Machine Instruction Calculation, referred to above. The comparator 27 also receives from the prioritizer 19 via an end bit flip-flop 28 an indication of the length determined by the prioritizer 19 in selecting the first available end bit set to one in the sequence of aligned bits from the rotator 16. As was pointed out above, the particular AND gate of the prioritizer 19 producing a one value indicated the length of the instruction in bytes. These lengths are compared. The result of the comparison if the lengths tested differ is transferred to an end bit generator 30 as a request to update the particular end bits.

The end bit generator 30 receives a second input from the instruction pointer as it is furnished to the rotators 15 and 16 and latches that value. The end bit generator thus knows where the instruction being processed by the U pipe started. It also receives the length value from the decoder 24 so that it knows the correct length of the instruction. Consequently, the end bit generator 30 understands the instruction for which the end bits need to be corrected in the cache memory 14. The correction is then made to the end bits in the cache memory 14 during a time which is not critical to the processing of the data.

Figure 3:
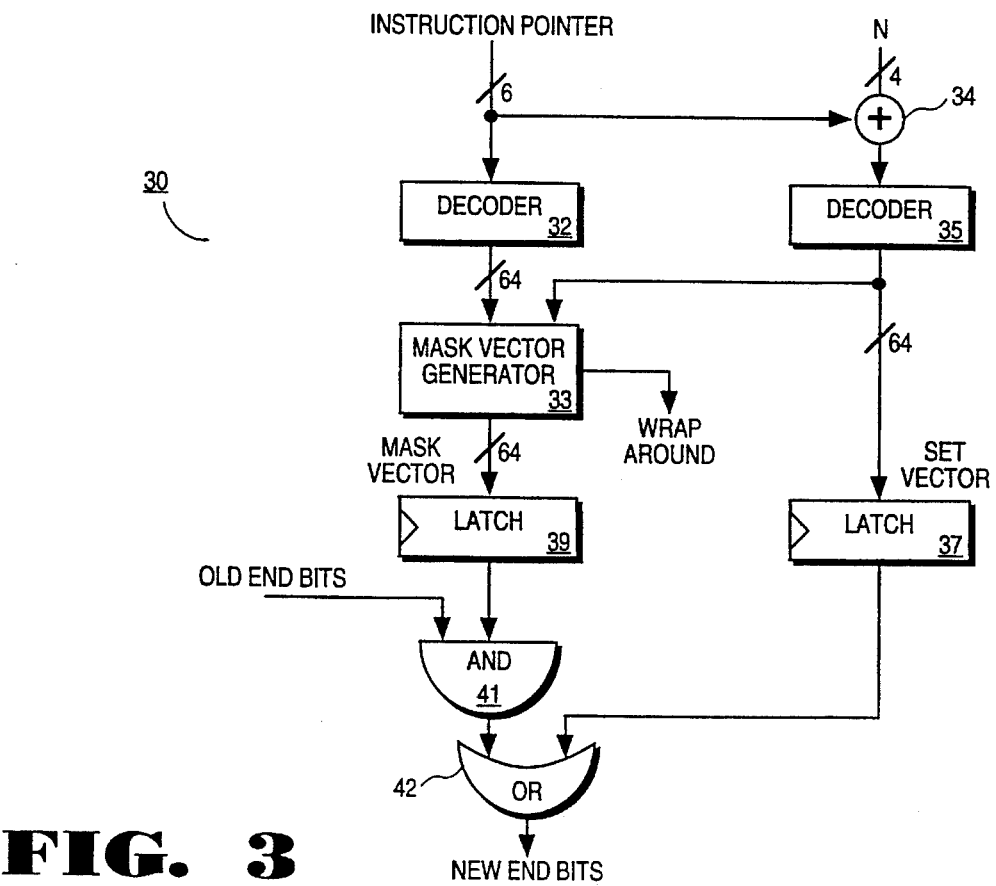
FIG. 3 is a more detailed description of a second portion of the arrangement of FIG. 1.

FIG. 3 illustrates in detail an end bit correction circuit 30. The circuit 30 receives a six bit binary value indicating the instruction pointer for the U pipe instruction being processed. This value is decoded by a decoder 32 and transferred to a mask vector generator 33 as a sixty-four sequential bit vector in which only the bit position of the pointer is set to a one. The six bit value of the pointer is also transferred to an adder 34 which receives a four bit binary value indicating the length of the instruction generated by the prioritizer 19. These values are added to provide a value which points to the end of the first instruction and which is sent to a second decoder 35. The decoder 35 produces a second sixty-four bit vector having a one in the position of the correct end bit for the first instruction.

The sixty-four bit vector produced by the decoder 35 is stored in a latch 37. The vector is also sent as a second input to mask vector generator 33. The mask vector generator 33 produces a sixty-four bit vector to be used as a mask for correcting the end bits. This mask stores zeroes beginning with the bit position which indicates the byte at which the instruction pointer points and continuing until the bit indicating the byte before the instruction ends.

All other bits are set to one. This result is shown in the diagram immediately to the left of a circuit 50 illustrated in FIG. 6.

Figure 6C:
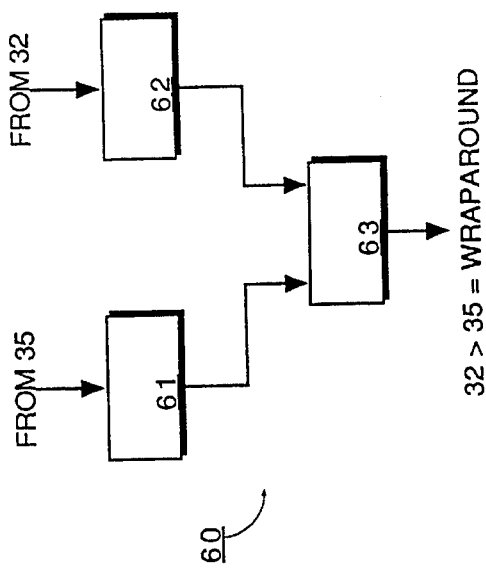
FIGS. 6a, 6b and 6c are a diagram illustrating details of circuitry for implementing the arrangement shown in FIG. 3.
Figure 6A:
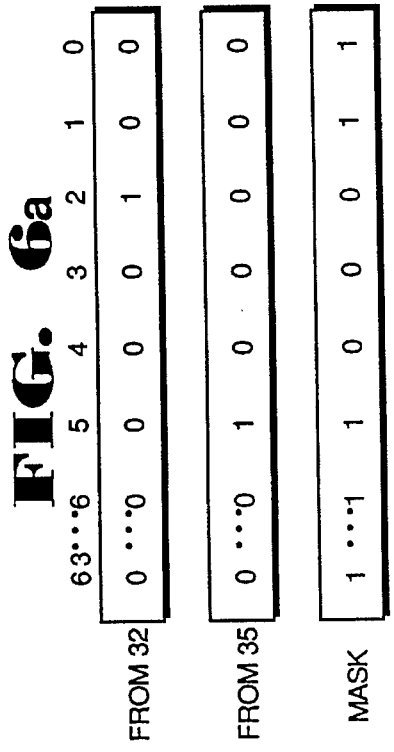
Figure 6B:
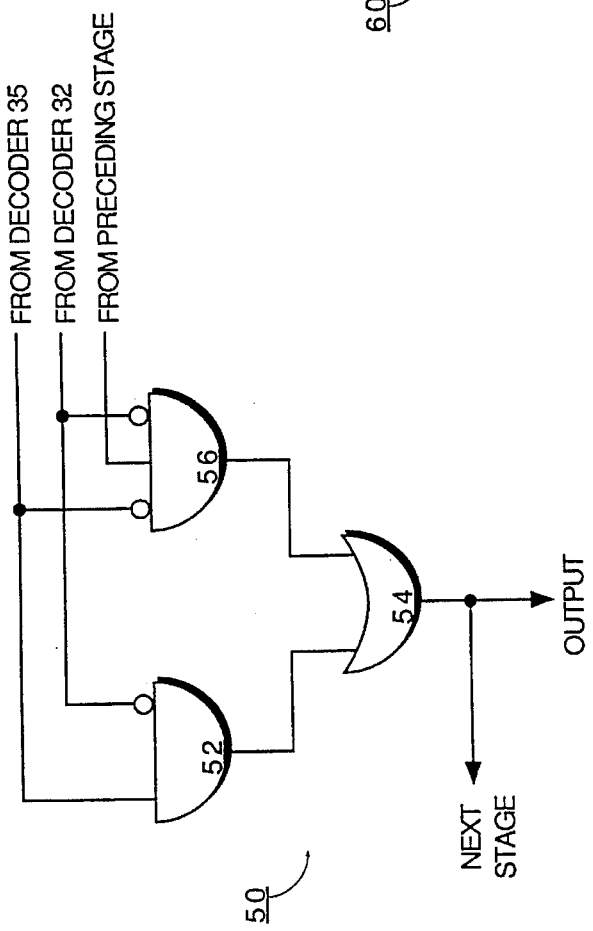

The mask vector generator 33 may be implemented by sixty-four stages one of which is illustrated in FIG. 6. Each stage 50 receives an input which indicates one of the bit positions in the vector produced by the decoder 32, a second input which indicates the same one of the bit positions of the vector produced by the decoder 35, and the output of the stage receiving the bits from those vectors in the bit position immediately preceding that bit position (the stage immediately to the right). The first stage receives the output of the last stage 50 in the sequence. As may be seen, an AND gate 52 receives the value of the bit at a particular position from the vector generated by decoder 35 and the inverted value of the bit at that position in the vector generated by the decoder 32. Thus, the AND gate 52 will produced a one value only at the bit position at which the bit of the vector from the decoder 35 has a one value. This one is transferred by an OR gate 54 to the output of the stage 50. A second AND gate 56 receives inverted input values in a particular bit position from each of the vectors produced by the decoders 32 and 35 and the output of the preceding stage 50. The AND gate 56 will produce a one output value in any bit position where the two vectors contain zero values and where the previous stage produced a one value. It will produce a zero output value in each bit position where the two vectors hold zero values and the previous stage produced a zero value. Gate 56 will also produce a zero output value where the bits of the two vectors from the decoders differ. The one values produced by the gate 56 are also transferred to the output of the stage by the OR gate 54.

Thus it will be seen that commencing at the stage at which the instruction pointer vector from decoder 32 holds a one value, the output of the mask vector generator 33 will be a zero value. A zero output will be produced at each succeeding stage until the stage at which the vector from decoder 35 indicating the end of the instruction is a one. This stage and all the succeeding stage will generate one values wrapping around to the beginning of the mask until the stage 50 immediately preceding the stage 50 which marks the beginning of the instruction.

This mask bit vector is placed in a latch 39. The mask vector generator 33 also indicates whether the instruction wraps around and spans two cache lines so that it requires two cache writes to accomplish the correction. This may be determined by determining whether the correct end bit furnished from decoder 35 precedes the instruction pointer bit in the sequence of bits. FIG. 6 also illustrates a circuit 60 which will provide this result. The circuit 60 includes a pair of counters 61 and 62 which count the bit positions up to the one in each vector and a comparator 63 to determine if the vector from the decoder 32 or that from the decoder 35 is greater.

Each bit of the mask in the latch 39 is ANDed at AND gates 41 with each of the bits from the old line stored in the end bit cache 14. Since the mask contains ones in all positions except those bits defining the instruction from its beginning through its next to last byte, each bit of the old end cache line will be reproduced except for the bits indicating the instruction through its next to last bit. The bits of the bit vector produced by each of the AND gates 41 are each then ORed by a series of OR gates 42 with the bit vector held in the latch 37. Since this vector contains a one only in the bit position indicating the correct last byte of the first instruction, the bit vector resulting from the OR gate 42 will have a one or a zero in each position as in the old cache line except for the bits indicating the bytes of the first instruction. All of the bits indicating bytes of the first instruction from the beginning to the next to last will be zeroes while the last bit will be a one. This bit vector may then be written to replace the old line in the end bit cache 14. If necessary, the operation may be repeated for a second cache line if the instruction wraps around two cache lines.

When the comparison is made by the comparison circuit 27 of FIG. 2 and an invalid result is obtained (the lengths do not compare), the invalid result is also sent to the V pipe channel to disable the processing of the second of the two instruction by the V pipe channel. In this manner, the instruction incorrectly aligned in the rotator 20 is simply discarded while the processing of the instruction in the U pipe channel continues in the normal manner. It should be noted that the new instruction pointer is obtained by adding the correct lengths for each instructions processed through the U pipe and the V pipe channels. Consequently, when the V pipe channel is disabled due to an incorrectly set end bit for the instruction in the U pipe channel, the new instruction pointer will include only the length of the first instruction. Consequently, the aborted instruction will be the next instruction to be run through the U pipe channel.

In order to provide an initial end bit for each instruction stored in the cache memory 12, each end bit of each byte of any new instruction is set to one when the instruction is placed in the cache memory 12. As will be understood by those skilled in the art, each single byte instruction will thus when first placed in the cache memory 12 have its end bit correctly set to indicate that it is a one byte instruction. However, all instructions longer than one byte will have all of the end bits of each byte set and will incorrectly indicate the length of the instruction. Consequently, the first time an instruction stored in the cache memory 12 is accessed, its length will be incorrect unless it is a one byte instruction. Thus, each instruction over one byte in length will have its end bit corrected the first time it is accessed so that the correct end bit will be designated thereafter. It has been found that in accessing instructions stored in the cache memory 12, a hit rate of approximately ninety-five percent is attained because the same instructions tend to be used over and over again during any period in which they are being used. Since end bits are set correctly on the first access of an instruction after it is placed in the cache memory 12, most accesses of the cache memory 12 appear to be second or greater accesses. Thus, the necessity of correcting the end bit on the first access causes very little delay within the system.

FIG. 4 is an example of the information contained in associated lines of the instruction cache 12 and the end bit cache 14. As may be seen, a first instruction commences at byte 02 indicated by the prefetch pointer as 02(hex). This first instruction is stored in bytes 02 through 06. The end of the first instruction in byte 06 is indicated by the binary one in bit 06 of the end bit cache. The first instruction opcode and the actual instruction are indicated in the figure. The opcode for the second instruction commences at byte 07 of the instruction cache line and continues until the next binary one in the end cache 14 at the position equivalent to byte 0C in the instruction cache 12 occurs. The opcode for the second instruction and the decoded instruction are shown in the figure. The end bits for the first instruction and the position of the next prefetch pointer are also shown in the figure.

Figure 5:
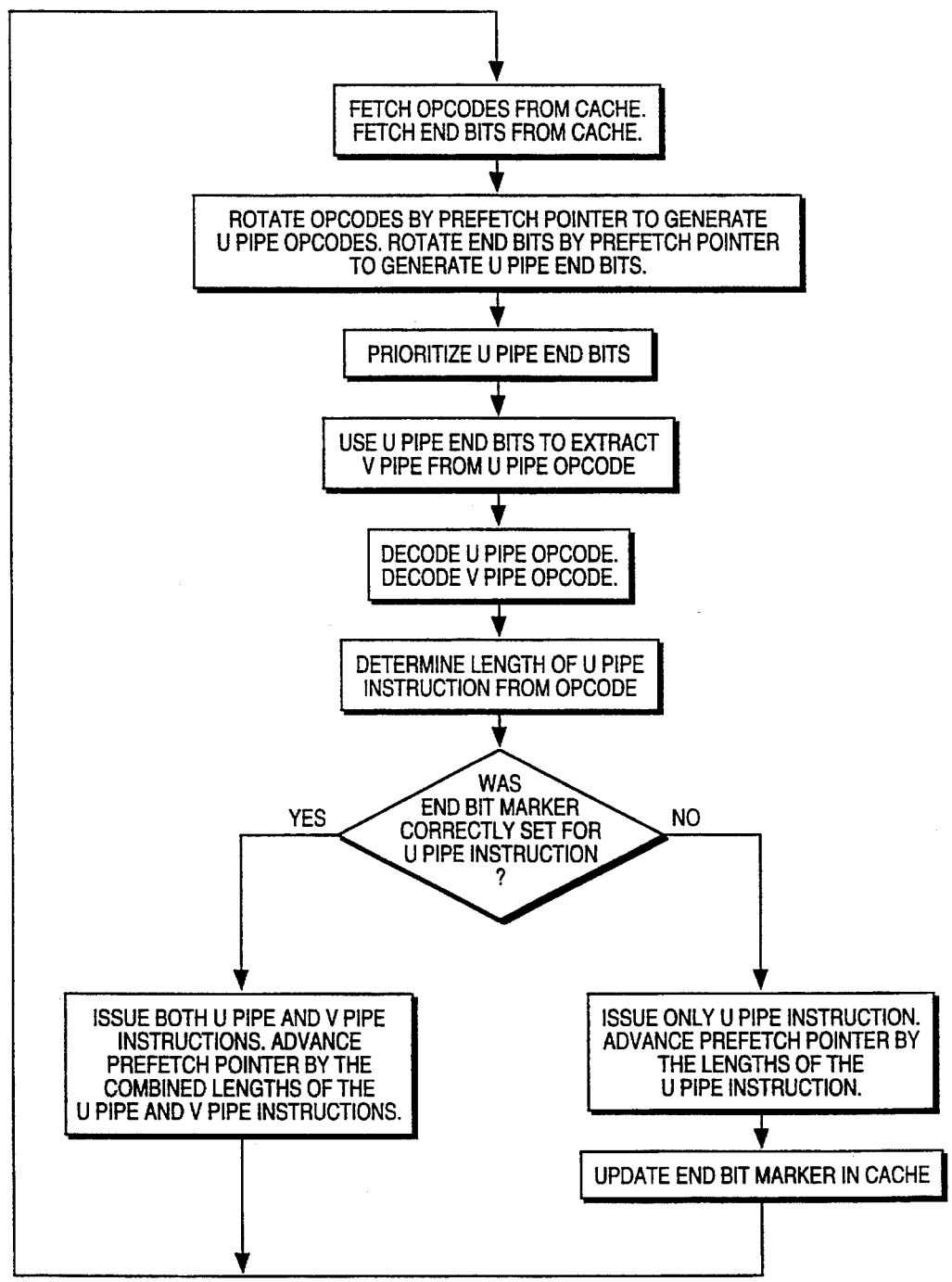
FIG. 5 is a flow chart illustrating a method practiced in accordance with the invention.

FIG. 5 lists in sequence the steps of the operation detailed above for accomplishing the present invention. Each of these steps has been discussed in detail above. Where two steps are placed in the same box of the figure, the steps are accomplished in parallel within the same clock period.

Although the present invention has been described in terms of a preferred embodiment, it will be appreciated that various modifications and alterations might be made by those skilled in the art without departing from the spirit and scope of the invention. For example, it will be recognized that although the preferred embodiment of the present invention utilizes a separate cache memory for storing the end bits associated with the bytes of each instruction, these end bits might as well be stored in the cache memory 12 by extending the length of the cache memory 12 to make room for these bits between each byte of instruction data. The invention should therefore be measured in terms of the claims which follow.

What is claimed is:

1. Apparatus for determining the length of an instruction being processed by a computer system in which instructions vary in length and appear sequentially in an instruction stream without differentiation from one another comprising means, prior to decoding the instruction, for providing an end bit for each predesignated length of an instruction and creating a set of end bits for a given instruction stream, which when set indicates that the instruction ends at the point, means for setting an end bit at a particular predesignated length of the instruction which is an end of the instruction, a first channel for processing a first instruction in sequence, a second channel for processing an instruction next following the first instruction, means for detecting a set end bit of an instruction to be processed by the first channel to determine an end point of that instruction and a beginning of a next instruction from the stream of instructions prior to decoding the first instruction, and means for aligning the end bit of the set of end bits of a stream of instructions with a first byte of an instruction being processed.

2. Apparatus for determining the length of an instruction being processed by a computer system in which instructions vary in length and appear sequentially in an instruction stream without differentiation from one another as claimed in claim 1, wherein the means, prior to decoding the instruction, for providing an end bit for each predesignated length of an instruction which when set indicates that the instruction ends at that point comprises a cache memory for storing end bits, and an instruction cache memory for storing instructions to be processed with which the end bits in the first cache memory are associated.

3. Apparatus for determining the length of an instruction being processed by a computer system in which instructions vary in length and appear sequentially in an instruction stream without differentiation from one another as claimed in claim 1 further comprising means for responding to a determination of a beginning of a next instruction from the stream of instructions provided by the means for detecting a set end bit of an instruction to be processed by the first channel to determine an end point of that instruction and a beginning of a next instruction from the stream of instructions to provide a next instruction for processing by the second channel.

4. Apparatus for determining the length of an instruction being processed by a computer system in which instructions vary in length and appear sequentially in an instruction stream without differentiation from one another as claimed in claim 1 in which the means for setting an end bit at a particular predesignated length of the instruction which is an end of the instruction comprises means for determining a length of an instruction as it is decoded, means for comparing an actual length with a length provided by the means for detecting a set end bit of an instruction to be processed by the first channel to determine an end point of that instruction and a beginning of a next instruction from the stream of instructions, and means for resetting an end bit which does not represent an actual length of an instruction.

5. Apparatus for determining the length of an instruction being processed by a computer system in which instructions vary in length and appear sequentially in an instruction stream without differentiation from one another as claimed in claim 4 in which the means for detecting a set end bit of an instruction to be processed by the first channel to determine an end point of that instruction and a beginning of a next instruction from the stream of instructions comprises rotator means for aligning end bits of a stream of instructions with a first byte of an instruction being processed, and means for selecting a first end bit set to a one from the aligned end bits.

6. Apparatus for determining the length of an instruction being processed by a computer system in which instructions vary in length and appear sequentially in an instruction stream without differentiation from one another as claimed in claim 5 in which the rotator means for aligning end bits of a stream of instructions with a first byte of an instruction being processed responds to an instruction pointer to align the end bits.

7. Apparatus for determining the length of an instruction being processed by a computer system in which instructions vary in length and appear sequentially in an instruction stream without differentiation from one another as claimed in claim 1 in which the particular predesignated length of the instruction is one byte.

8. A method for determining the length of an instruction being processed by a computer system in which instructions vary in length and appear sequentially in an instruction stream without differentiation from one another comprising the computer implemented steps of; prior to decoding the instructions, providing an end bit for each predesignated length of an instruction which, when set indicates that the instruction ends at that point setting an end bit at a particular predesignated length of the instruction which is an end of the instruction, detecting a set end bit of an instruction to be processed by a first channel to determine an end point of that instruction and a beginning of a next instruction from the stream of instructions prior to decoding a first instruction, processing a first instruction in sequence by means of the first processing channel, and processing an instruction next following the first instruction by means of a second processing channel.

9. A method for determining the length of an instruction being processed by a computer system in which instructions vary in length and appear sequentially in an instruction stream without differentiation from one another as claimed in claim 8 in which the step of prior to decoding the instruction, providing an end bit for each predesignated length of an instruction which end bit may be set to indicate that the instruction ends at that point comprises the steps of storing end bits in a cache memory for storing end bits, each such end bit indicating a particular length of an instruction stored in cache memory for storing instructions to be processed with which the end bits in the first cache memory are associated.

10. A method for determining the length of an instruction being processed by a computer system in which instructions vary in length and appear sequentially in an instruction stream without differentiation from one another as claimed in claim 8 further comprising the step of responding to a determination of a beginning of a next instruction from the stream of instructions to provide a next instruction for processing by the second channel.

11. A method for determining the length of an instruction being processed by a computer system in which instructions vary in length and appear sequentially in an instruction stream without differentiation from one another as claimed in claim 8 in which the step of setting an end bit at a particular predesignated length of the instruction which is an end of the instruction comprises the steps of determining a length of an instruction as it is decoded, comparing an actual length with a length provided in the step of detecting a set end bit of an instruction to be processed by the first channel to determine an end point of that instruction and a beginning of a next instruction from the stream of instructions prior to decoding a first instruction, and resetting an end bit which does not represent an actual length of an instruction.

12. A method for determining the length of an instruction being processed by a computer system in which instructions vary in length and appear sequentially in an instruction stream without differentiation from one another as claimed in claim 11 in which the step of detecting a set end bit of an instruction to be processed by the first channel to determine an end point of that instruction and a beginning of a next instruction from the stream of instructions prior to decoding a first instruction comprises the steps of aligning end bits of a stream of instructions with a first byte of an instruction being processed, and selecting a first end bit set to a one from the aligned end bits.

13. A method for determining the length of an instruction being processed by a computer system in which instructions vary in length and appear sequentially in an instruction stream without differentiation from one another as claimed in claim 12 in which the step of aligning end bits of a stream of instructions with a first byte of an instruction being processed responds to an instruction pointer to align the end bits.

14. A method for determining the length of an instruction being processed by a computer system in which instructions vary in length and appear sequentially in an instruction stream without differentiation from one another as claimed in claim 8 in which the particular predesignated length of the instruction is one byte.

15. Apparatus for determining the length of an instruction being processed by a computer system in which instructions vary in length and appear sequentially in an instruction stream without differentiation from one another comprising a circuit for providing, prior to decoding the instruction, an end bit for each predesignated length of an instruction which when set indicate that the instruction ends at that point, a circuit for setting an end bit at a particular predesignated length of the instruction which is an end of the instruction, a first channel for processing a first instruction in sequence, a second channel for processing an instruction next following the first instruction, and a circuit for detecting a set end bit of an instruction to be processed by the first channel to determine an end point of that instruction and a beginning of a next instruction from the stream of instructions prior to decoding the first instruction.

16. Apparatus for determining the length of an instruction being processed by a computer system in which instructions vary in length and appear sequentially in an instruction stream without differentiation from one another as claimed in claim 15, wherein the circuit for providing, prior to decoding the instruction, an end bit for each predesignated length of an instruction which when, set indicates that the instruction ends at that point comprises a cache memory for storing end bits, and an instruction cache memory for storing instruction to be processed with which the end bits in the first cache memory are associated.

17. Apparatus for determining the length of an instruction being processed by a computer system in which instructions vary in length and appear sequentially in an instruction stream without differentiation from one another as claimed in claim 15 further comprising a circuit for responding to a determination of a beginning of a next instruction from the stream of instructions provided by the circuit for detecting a set end bit of an instruction to be processed by the first channel to determine an end point of that instruction and a beginning of a next instruction from the stream of instructions to provide a next instruction for processing by the second channel.

18. Apparatus for determining the length of an instruction being processed by a computer system in which instructions vary in length and appear sequentially in an instruction stream without differentiation from one another as claimed in claim 15 in which the circuit for setting an end bit at a particular predesignated length of the instruction which is an end of the instruction comprises a circuit for determining a length of an instruction as it is decoded, a circuit for comparing an actual length with a length provided by the circuit for detecting a set end bit of an instruction to be processed by the first channel to determine an end point of that instruction and a beginning of a next instruction from the stream of instructions, and a circuit for resetting an end bit which does not represent an actual length of an instruction.

19. Apparatus for determining the length of an instruction being processed by a computer system in which instructions vary in length and appear sequentially in an instruction stream without differentiation from one another as claimed in claim 18 in which the circuit for detecting a set end bit of an instruction to be processed by the first channel to determine an end point of that instruction and a beginning of a next instruction from the stream of instructions comprises a rotator for aligning end bits of a stream of instructions with a first byte of an instruction being processed, and a circuit for selecting a first end bit set to a one from the aligned end bits.

20. Apparatus for determining the length of an instruction being processed by a computer system in which instructions vary in length and appear sequentially in an instruction stream without differentiation from one another as claimed in claim 19 in which the rotator for aligning end bits of a stream of instructions with a first byte of an instruction being processed responds to an instruction pointer to align the end bits.

* * * * *

UNITED STATES PATENT AND TRADEMARK OFFICE
CERTIFICATE OF CORRECTION

PATENT NO. : 5,586,276
DATED : December 17, 1996
INVENTOR(S) : Grochowski et al.

It is certified that error appears in the above-identified patent and that said Letters Patent is hereby corrected as shown below:

In column 3 at line 52 delete "Operator" and insert --operator--

In column 11 at line 40 delete "indicate" and insert --indicates--

Signed and Sealed this

Twentieth Day of May, 1997

Attest:

BRUCE LEHMAN

*Attesting Officer*   *Commissioner of Patents and Trademarks*